2 Sheets—Sheet 1.
G. MOORE.
Cultivator.
No. 217,811. Patented July 22, 1879.
FIG. I.
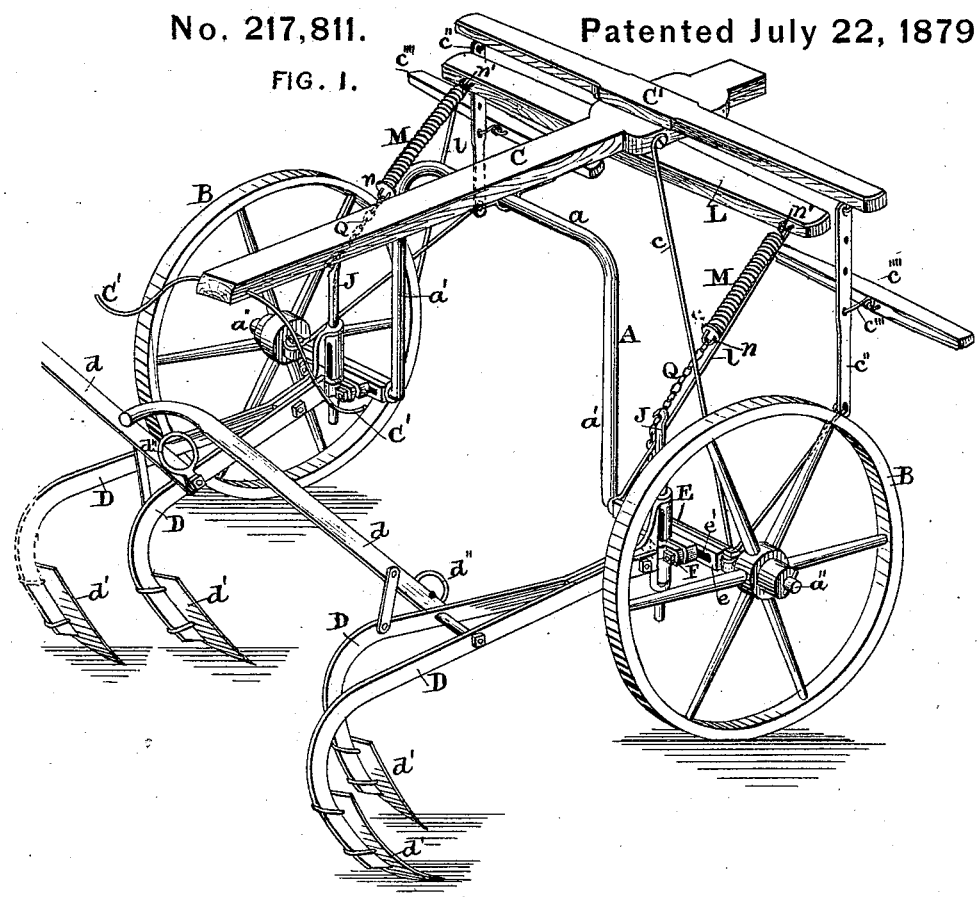
FIG. II.
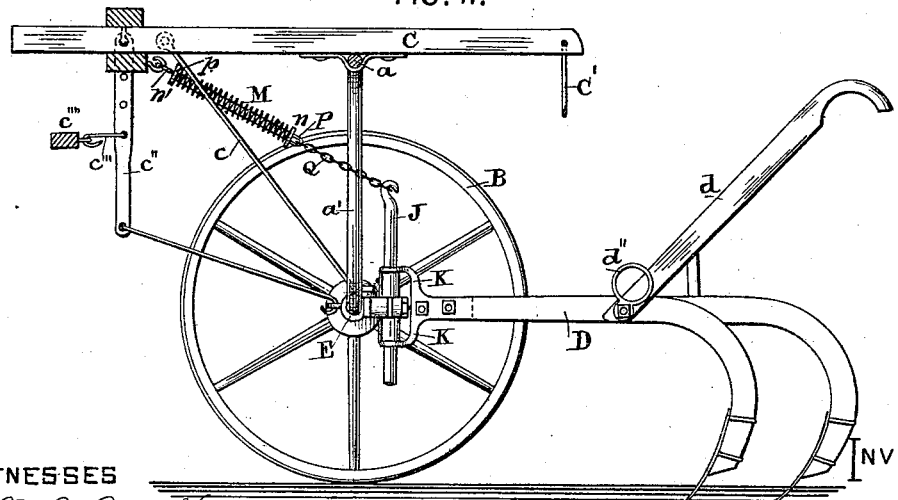
WITNESSES
F. B. Brock.
D. G. Stuart
INVENTOR:
Gilpin Moore,
By W. B. Richards,
ATTORNEY.

G. MOORE.
Cultivator.
No. 217,811. Patented July 22, 1879.
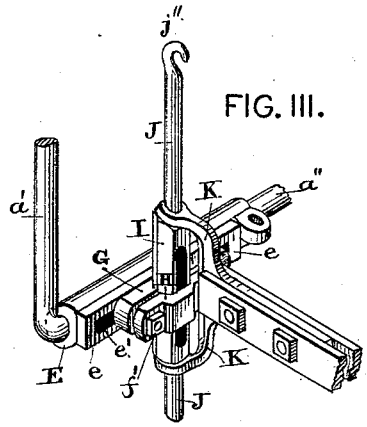
FIG. III.
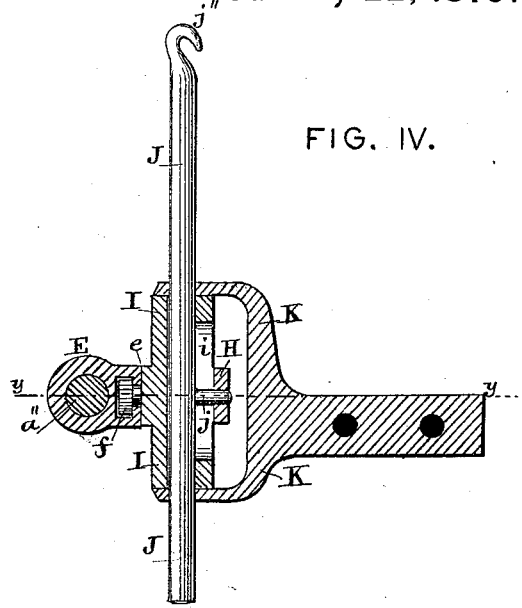
FIG. IV.
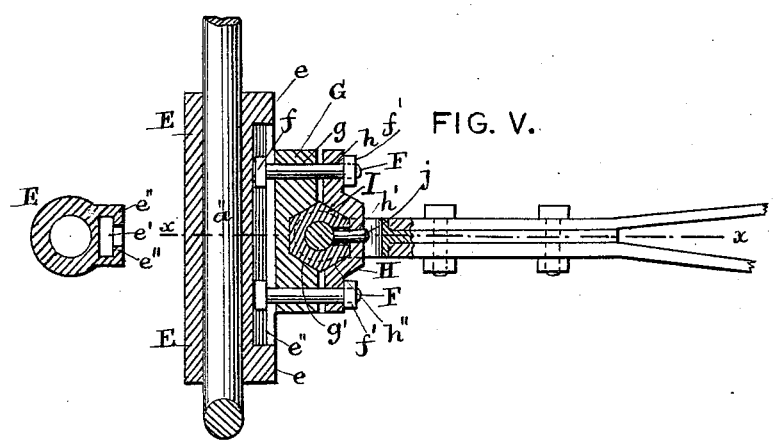
FIG. V.
FIG. VI.
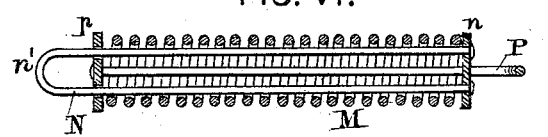
WITNESSES
F. B. Brock
D. G. Stuart
INVENTOR:
Gilpin Moore,
By W. B. Richards,
ATTORNEY.

UNITED STATES PATENT OFFICE.

GILPIN MOORE, OF MOLINE, ILLINOIS, ASSIGNOR TO DEERE & CO., OF SAME PLACE.

IMPROVEMENT IN CULTIVATORS.

Specification forming part of Letters Patent No. 217,811, dated July 22, 1879; application filed February 4, 1879.

*To all whom it may concern:*

Be it known that I, GILPIN MOORE, of Moline, in the county of Rock Island and State of Illinois, have invented certain new and useful Improvements in Cultivators; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a perspective view of my improved cultivator. Fig. 2 is a longitudinal vertical sectional view. Fig. 3 is an enlarged perspective view of one of the couplings. Fig. 4 is a vertical sectional view of the coupling in the line $x\ x$ in Fig. 5. Fig. 5 is a horizontal sectional view of the coupling in the line $y\ y$ in Fig. 4. Fig. 6 is a longitudinal sectional view of one of the springs.

This invention consists in the use of springs, connected at one end with extended arms, the lower ends of which form the journal-bearings on which the plows have lateral movement, and at their other ends with the draft-frame or wheel-frame at a point forward of the axle, so as to sustain the weight of the gangs of plows and the draft-pole on the axle and wheels.

The invention further consists in improvements in the construction and combination of parts, as hereinafter fully described, and set forth in the claims hereto annexed.

Referring to the drawings by letters, A is a cultivator-axle, having elevated central part, $a$, vertical side parts, $a'$, and horizontal ends $a''$, supported on wheels B. C is a draft-pole, fixed on the axle A, and stayed by braces $c$, and carries an ordinary draft-bar, $c'$, which is provided with draft devices $c''\ c'''\ c''''$. D D are the plow-beams, having handles $d$, and plows or shovels $d'$, and rings or loops $d''$, which rings may be engaged with hook-rods $C'$, on the rear end of the draft-pole C, to sustain the plows in an elevated position.

The foregoing parts described by letter do not differ from cultivators of ordinary construction.

E is a sleeve, fitted so that it may revolve on the end $a''$ of the axle, and has a flat side, $e$, in which is a slot, $e'$, extending nearly the length of the sleeve. F F are bolts fitted in the slot $e'$ so that they may be adjusted at different positions, and held therein by their heads $f$ resting against shoulders $e''$, one on each side of the slot $e'$. G is a plate or half-box, which rests against the flat side of the sleeve E, and has holes $g$, through which the bolts F pass, and a vertical angular groove, $g'$, on its outer side. H is also a plate or half-box, with holes $h$ for the bolts F, a central hole, $h'$, and an angular groove, $h''$, on its inner face.

I is a sleeve, angularly shaped on its exterior, and has a slot, $i$, in one side. The sleeve I is held in a vertical position in the grooves $g'\ h''$ and between the boxes G H by the bolts F and nuts $f'$, its angular exterior preventing it from rotative movement, and may be adjusted at higher or lower planes by raising and lowering it when the nuts on the bolts F are loosened for the purpose, to adjust the height of the forward ends of the plow-beams, which are attached thereto, as hereinafter described.

The boxes G H may be adjusted in different positions laterally, to adjust the distance between the plows, by loosening the same nuts and sliding the bolts F in the slots $e'$.

J is a spindle, which passes through the sleeve I longitudinally, and is held from longitudinal or rotary motion therein by a stud, $j$, which projects from the rear side of the spindle through the slot in the sleeve I and into the hole $h'$ in the box H.

The slot $i$ in the sleeve I prevents the stud $j$ interfering with the longitudinal adjustment of the sleeve I, hereinbefore described.

The upper end of the spindle J is extended, as shown in the drawings, and has a hook, $j''$, on its end.

K K are brackets attached to the forward end of a plow-beam and extending forward, one upward and one downward, so as to rest one above and one below the sleeve I, and each bracket having a circular hole, through which the spindle J passes, to form a journal on which the plow-beam may have lateral movement or oscillation.

Vertical movement or oscillation of the plows is effected by the sleeves E turning on the axle, and the bearings on which both vertical and lateral movement of the plows is effected are so elongated as to reduce to the lowest minimum the tendency of the plows to wabble in operation in the field.

L is a bar, fixed transversely to the draft-pole C and stayed by braces $l$. M is a spiral spring, through which a double wire, N, extends, the lower end of which wire is attached to a disk, $n$, to which the lower end of the spring is attached, and the upper end of the wire N is formed into a loop, $n'$, by which it is secured to one end of the bar L, so as to secure the distant end of the spiral spring to the bar L. P is also a double wire passed through the spiral spring, and attached to its end next the bar L by a disk, $p$, and has a chain, Q, attached to its lower end.

It will be seen that drawing on the chain Q will compress the spiral spring M longitudinally in a manner most favorable to use its force and to preserve its strength, and when compressed so as to bring the spirals together the spring will act as a stop to limit the downward movement of the rear end of the cultivator.

In operation different links of the chain Q may be engaged with the hook on the upper end of the arm or spindle J, as it is desired to have the spring M more or less compressed and to exert a greater or lesser upward force on the plows when in operation in the field.

It will be evident that sustaining the plows at their rear ends by a yielding support will not only cause them to run easier and reduce the draft, but will also render them more easily manipulated by the plowman, and greatly reduce the labor necessary to guide them properly and to raise them from the ground to suspend them, or for other purposes; and especially will it be seen that by my arrangement of the springs, connected at their forward ends forward of the axle, and at their rear ends to an arm which forms the journal on which the plows have lateral movement, and which is located in rear of the axle and at the forward end of the plow-beams, the weight of the rear ends of the gangs will tend to raise the forward end of the draft-pole, and thereby throw the weight of these parts pendent from the axle onto the axle and wheels B, thereby reducing the draft of the machine to the lowest minimum when in operation; and, further, that the attachment of the springs to the beams is such that if the beam is deflected laterally at its rear end for any purpose the force of the spring will not be exerted to still further deflect it.

What I claim as new is—

1. In a wheel-cultivator, the combination of the axle, one or more plows hinged to the axle, and one or more springs, connected at their rear ends to the forward ends of the plow-beams, and at their forward ends to the wheel-frame in front of the axle, substantially as set forth.

2. In a cultivator-coupling, the slotted sleeve E, in combination with boxes G H, adjustably secured to the sleeve by bolts and nuts, substantially as described, and for the purpose specified.

3. In combination with the sleeve E and adjustable boxing G H, the slotted sleeve I, spindle J, and plow-beams having brackets K, substantially as and for the purpose specified.

4. The vertically-adjustable slotted sleeve I, in combination with brackets K, plow-beams D, spindle J, with stud $j$, and boxes G H, which sustain the sleeve I and spindle J, substantially as and for the purpose specified.

5. In combination with the wheel-frame and plows, the spindle J or elongated journal for the plow-beam, and the spring M, connecting the elongated journal or spindle J and the wheel-frame, substantially as and for the purpose specified.

6. In combination with a cultivator wheel-frame and plow, a spring connected at one end to the wheel-frame, and at its other end to the journal-bolt on which the plow-beam has lateral motion, so that the plow-sustaining force of the spring will not have a tendency to draw the plow to one side whenever it is deflected for any purpose, substantially as and for the purpose specified.

In testimony that I claim the foregoing as my own I affix my signature in presence of two witnesses.

GILPIN MOORE.

Witnesses:
  HENRY E. LEWIS,
  EUGENE LEWIS.